United States Patent
Palmer et al.

(10) Patent No.: US 8,119,952 B2
(45) Date of Patent: Feb. 21, 2012

(54) SYSTEM WITH FLICKER CONTROL AND METHOD OF REDUCING FLICKER GENERATED BY A SYSTEM

(75) Inventors: Tim Palmer, Cambs (GB); Paul Winter, Suffolk (GB); Brendan Ronayne, Cambridgeshire (GB); Matthew Charles Bradley Lumb, Hartfordshire (GB)

(73) Assignee: Nestec S.A., Vevey (CH)

( * ) Notice: Subject to any disclaimer, the term of this patent is extended or adjusted under 35 U.S.C. 154(b) by 530 days.

(21) Appl. No.: 12/357,770

(22) Filed: Jan. 22, 2009

(65) Prior Publication Data
US 2009/0189544 A1    Jul. 30, 2009

(30) Foreign Application Priority Data
Jan. 24, 2008   (EP) ..................................... 08150629

(51) Int. Cl.
*H05B 1/02* (2006.01)
(52) U.S. Cl. ......... 219/483; 219/492; 392/478; 392/490
(58) Field of Classification Search .......... 392/465–496; 219/482–506; 307/39–42
See application file for complete search history.

(56) References Cited

U.S. PATENT DOCUMENTS

| | | | |
|---|---|---|---|
| 4,829,159 A | 5/1989 | Braun et al. | |
| 6,246,831 B1 | 6/2001 | Seitz et al. | |
| 6,541,740 B2 * | 4/2003 | Ziaimehr et al. | 219/486 |

FOREIGN PATENT DOCUMENTS

| | | |
|---|---|---|
| DE | 2 241 681 | 3/1974 |
| DE | 36 01 555 | 7/1987 |
| DE | 195 31 134 | 2/1997 |
| DE | 197 28 333 | 11/1999 |
| EP | 0 563 790 | 10/1993 |

OTHER PUBLICATIONS

European Search Report dated Sep. 1, 2008, 3 pages.
Written Opinion, EP 08 150 629.7, 5 pages.

\* cited by examiner

*Primary Examiner* — Shawki S Ismail
*Assistant Examiner* — Jany Tran
(74) *Attorney, Agent, or Firm* — K&L Gates LLP

(57) ABSTRACT

A system is disclosed that is designed to be connected to an electrical power supply. The system comprises a plurality of electric load component comprising stages for cooperatively producing an output ($T_{out}$), each stage in a first subset of the stages comprising at least one electrical load component having a first load and each stage in a second subset of the stages comprising at least one electrical load component having a second load, the first load being larger than the second load. The system has a controller for controlling the electrical load components. The controller is designed to estimate voltage variations on the electrical power supply from the switching frequencies of the respective electrical load components during a predefined time frame. The controller further implements an algorithm for adjusting the switching frequencies of the electrical load components having the first load and the electrical load components having the second load in response to the estimation to reduce the voltage variations on the electrical power supply during a next time frame whilst ensuring that the plurality of stages are capable of producing the output ($T_{out}$) during the next time frame. The system thus ensures that the amount of flicker generated by the system remains within acceptable limits.

16 Claims, 3 Drawing Sheets

SYSTEM WITH FLICKER CONTROL AND METHOD OF REDUCING FLICKER GENERATED BY A SYSTEM

BACKGROUND

The present invention relates to a system arranged to be connected to an electrical power supply, the system comprising a plurality of stages for cooperatively producing an output, each stage comprising an electrical load component.

The present invention further relates to a method for adjusting the voltage variations on an electrical power supply caused by such a system for reducing the human detectability of the voltage variations in e.g. light sources connected to the electrical power supply.

SUMMARY

The occurrence of voltage variations and in particular voltage drops on an electrical power supply may cause unwanted effects. For instance, a voltage drop may cause an electrical appliance to fail or at least produce an observable variation in its output. For instance, an incandescent light bulb may exhibit a temporary variation in its light intensity caused by the voltage variation. This effect is commonly known as flicker, and is perceived to be an undesirable effect, especially when the flicker frequency becomes noticeable to the human eye. This typically applies for flicker frequencies from 2 Hz-120 Hz, with flicker at 8.8 Hz being especially irritable to humans.

Voltage variations on the electrical power supply are typically caused by changes in the load connected to the electrical power supply. Both the frequency of such a change and the amount of change in load can cause such variations. Such variations may for instance be caused by a system connected to an electrical power supply, with the system comprising a plurality of electrical load component comprising stages for cooperatively producing an output. An example of such a system may be an electrical appliance comprising a plurality of heating elements that frequently switch on and off, thus frequently causing voltage variations on the electrical power supply, especially when the load of the heating elements is substantial. To this end, several solutions have been proposed to reduce flicker observable to the human eye arising from the switching behavior of such systems.

U.S. Pat. No. 4,829,159 discloses a method of controlling heating loads in an oven. The loads are energized in sequence to prevent flickering when the loads are coupled to a common phase of the alternating current. The loads may be gradually switched on and off to further reduce the voltage variations on the electrical power supply.

U.S. Pat. No. 6,246,831 discloses an instantaneous flow-through heater system having a plurality of heating chambers that each comprise a heating element. The system comprises a power modulator that calculates the required power to be consumed by the heating elements over a time interval that is shorter than the typical fluid heater response time, e.g. 7.5 s. The time interval is divided in half second intervals and the heating elements are switched according to predefined patterns of power applications during the half second intervals. The patterns are designed to have the heating elements consume a predefined amount of power. During the time interval, the power modulator dithers between patterns that have a power consumption value immediately above and below the required power consumption value during each half second interval such that the power consumed by the heater elements during the full time interval does not significantly deviate from the required power consumption. The patterns either impose high frequency or low frequency switching characteristics on the heating elements such that any flicker caused by this switching cannot be observed by the human eye.

This approach has several limitations. For instance, it has to rely on predefined switching patterns to ensure that observable flicker is avoided. Moreover, it can increase voltage variations on an electrical power supply, which may not be desirable in case the electrical power supply supplies power to appliances that may suffer from temporary loss of service when being exposed to such voltage variations. Also, this approach only targets the frequency component of the voltage variations to reduce observable flicker.

The present invention seeks to provide a system comprising a plurality of loads that can adjust both the load variation frequency and magnitude to reduce voltage variations on an electrical power supply The present invention further seeks to provide a method for controlling such a system.

According to a first aspect of the present invention, there is provided a system arranged to be connected to an electrical power supply, the system comprising a plurality of electric load component comprising stages for cooperatively producing an output, each stage in a first subset of said stages comprising at least one electrical load component having a first load and each stage in a second subset of said stages comprising at least one electrical load component having a second load, the first load being larger than the second load; and a controller for controlling the electrical load components, the controller being arranged to estimate voltage variations on the electrical power supply from the switching frequencies of the respective electrical load components during a predefined time frame, the controller comprising an algorithm for adjusting the switching pattern of the electrical load components having the first load and the electrical load components having the second load in response to said estimation to reduce the voltage variations on the electrical power supply during a next time frame whilst ensuring that the plurality of stages are capable of producing the output during the next time frame.

The system of the present invention provides a controller that is capable of estimating the amount of flicker caused by the switching of its electrical load components, and adjust the switching behavior accordingly. In particular, the controller implements an algorithm that acts on a flicker estimation by the controller and redistributes the workload of the system from the higher load components to the lower load components without significantly comprising on the output performance of the system. This advantageously affects the human perception of flicker as follows. Because the high load components are more likely to cause voltage variations on the electrical power supply, the reduction of the switching frequency of the high load components reduces the likelihood of flicker occurring. This comes at the price of having to more frequently switch the lower load components, but the intensity of any flicker caused by the switching of the lower load components is less noticeable than the flicker caused by the higher load components, which yields an overall reduction in observable flicker.

The controller may implement a software based flicker meter. This has the advantage that a compact controller can be achieved, thus reducing the overall size of the system. The controller may be arranged to estimate a short-term flicker value ($P_{st}$) from the switching of the electrical load components during the present time frame, with the algorithm being configured to reduce the switching frequencies of the electrical load components having a first load and to increase the switching frequencies of the electrical load components having the second load if the estimated short-term flicker value exhibits an upward trend compared to a previous time frame. This has the advantage that the controller only rebalances the load distribution of the system when the flicker behavior of the system deteriorates. To further reduce unnecessary load rebalancing, the flicker reduction algorithm may not be activated until the short-term flicker value exceeds a predefined threshold.

The controller may comprise a further algorithm to delay the activation of at least some of the electrical load components if the short-term flicker value exceeds a critical threshold, e.g. $P_{st}<1$ to ensure that the short-term flicker value does not exceed 1. In other words, the further algorithm provides a fallback mechanism in case the first algorithm is incapable of keeping the short term flicker value below the critical threshold. Consequently, a slight reduction of the quality of the output may occur, e.g. a larger deviation in output fluid temperature control is achieved in case the system implements a multi-stage fluid heater. In the context of the present invention, such a reduction of output quality is deemed acceptable if the amount of flicker can be kept under the critical threshold for standards compliance. For instance, in on-demand heaters, standards compliance dictates that $P_{st}$ should not exceed 1.

According to a further aspect of the present invention, there is provided a method of controlling a system connected to an electrical power supply, the system comprising a plurality of electric load component comprising stages for cooperatively producing an output, each stage in a first subset of said stages comprising at least one electrical load component having a first load and each stage in a second subset of said stages comprising at least one electrical load component having a second load, the first load being larger than the second load, the method comprising estimating voltage variations on the electrical power supply from the switching frequencies of the respective electrical load components during a predefined time frame; and adjusting the switching pattern of the electrical load components having the first load and the electrical load components having the second load in response to said estimation to reduce the voltage variations on the electrical power supply during a next time frame whilst ensuring that the plurality of stages are capable of producing the output during the next time frame.

Such a method effectively reduces voltage variations on an electrical power supply that may lead to observable flicker as discussed above.

Additional features and advantages are described herein, and will be apparent from the following Detailed Description and the figures.

BRIEF DESCRIPTION OF THE FIGURES

The invention is described in more detail and by way of non-limiting examples with reference to the accompanying drawings, wherein.

DETAILED DESCRIPTION

Figure 1:
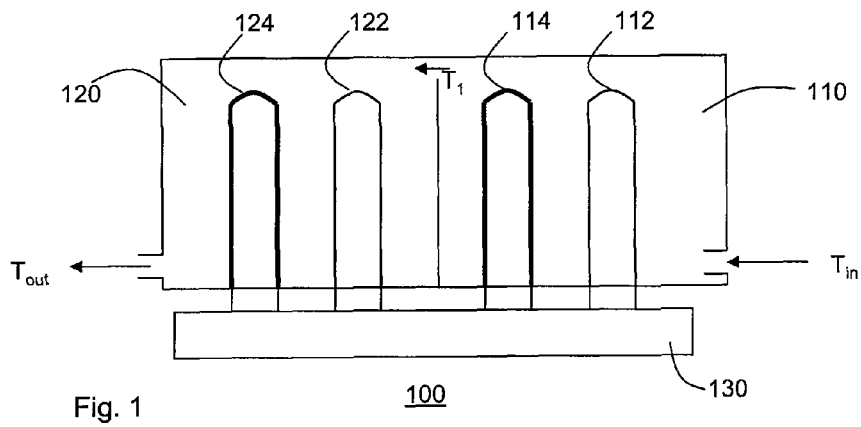
FIG. 1 shows an example of a system of the present invention.

It should be understood that the Figures are merely schematic and are not drawn to scale. It should also be understood that the same reference numerals are used throughout the Figures to indicate the same or similar parts.

FIG. 1 shows an example implementation of a system of the present invention. In FIG. 1, the system comprises an on-demand fluid heater 100, e.g. an on-demand cartridge heater for preparing hot drinks, that has a first heating stage 110 comprising a first electrical load component in the form of a first heating element 112 and a second electrical load component in the form of a second heating element 114, and a second heating stage 120 comprising a first electrical load component in the form of a first heating element 122 and a second electrical load component in the form of a second heating element 124. The first stage 110 is arranged to heat an incoming fluid from $T_{in}$ to $T_1$, whereas the second stage 120 is arranged to heat the fluid from first stage 110 from $T_1$ to $T_{out}$. The heating elements are individually controlled by a controller 130, which may be responsive to sensors (not shown) placed in strategic positions within the fluid heater to activate the heating elements in response to the sensor readings. The heater elements 114 and 124 may have twice the capacity of the heating elements 112 and 122, e.g. 534 W and 267 W respectively. Obviously, other ratios between the loads of these heating elements are equally feasible. The heating elements are typically switched off or switched on to a fully powered state. The heating elements may be controlled by well-known drivers such as Triac drivers that are controlled by the controller 130. The heating elements are typically turned on and off at the zero crossing of the AC mains.

It is emphasized that the system of the present invention is not limited to this specific implementation; for instance, the fluid heater 100 may comprise more than two stages and/or more than two heating elements per stage. Alternatively, the fluid heater may comprise only one heating element per stage, with different stages comprising heating elements having different electrical loads. In FIG. 1, the heating elements are mounted in series by way of non-limiting example only. Other arrangements, e.g. physically co-wound heating elements, are equally feasible. The present invention is also not limited to fluid heaters, but may be applied to any multi-stage system that comprises electrical load components in separate stages, e.g. ovens comprising multiple heating elements. In the context of the present invention, the phrase stage is not intended to imply the presence of separate compartments or chambers in the system of the present invention. In abstract terms, the phrase 'stage', when used in reference to an electrical load component refers to a volume surrounding the electrical load component.

Figure 2:
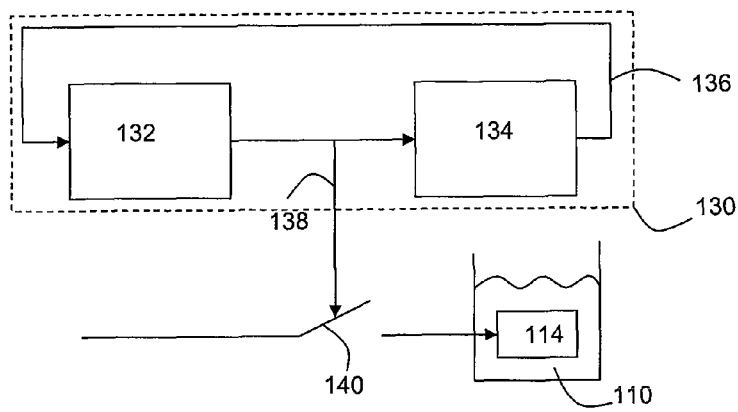
FIG. 2 shows an aspect of a system of the present invention in more detail.

FIG. 2 schematically depicts the principle of the present invention. The controller 130 comprises a heating controller 132 that provides a control signal to a switch 140 via control signal path 138. The switch 140 is used to connect or disconnect a heating element such as the first heating element 112 in the first heating stage 110 from an alternating current supply, e.g. AC mains supply. The controller 130 further comprises a flicker analyzer block 134, which has an input coupled to control signal path 138. The flicker analyzer block 134 is arranged to mathematically model the effects of the application and removal of the electrical load of the heating element 112 on the occurrence of lighting flicker. The modeling results are provided to the heating controller 132 via feedback path 136 and used as an additional control input, e.g. in addition to a temperature sensor reading, to reduce flicker effects resulting from the application and removal of the electrical load of the heating element 112.

It will be appreciated that the flicker analyzer block 134 typically receives the control signals for all electrical load components of the system, in order to be able to model the flicker generated by the system. The implementation of the heating controller 132 may be realized in several ways, including a single controller arranged to generate a plurality of individual control signals for the respective electrical load components of the system or a plurality of heating controllers 132 each configured to generate a single control signal for a dedicated electrical load component. In case of a single heating controller 132, the algorithm for rebalancing of the electrical loads of the system may be implemented in the heating controller 132, whereas in the case of a plurality of heating controllers 132 each configured to generate a single control signal for a dedicated electrical load component, the algorithm for rebalancing of the electrical loads of the system may be implemented in the heating flicker analyzer block 134.

External flicker analyzer measurements on the on-demand heater shown in FIG. 1 have been performed to show that rebalancing the system reduces $P_{st}$. These measurements have demonstrated that for instance an alteration of a target output temperature of an on-demand heater stage can reduce $P_{st}$. It is pointed out that both an increase and a decrease of target output temperature may have a $P_{st}$-reducing effect, depending on the actual load demands. This understanding has been used to develop the following flicker reduction approach.

The flicker reduction algorithm is configured to ensure that $1 \geq P_{st}$ at all times. In addition, the algorithm is configured to try and avoid the occurrence of the situation $1 \geq P_{st} \geq$ 'threshold', where 'threshold' can be a constant or dynamically adjusted variable depending on a rate of change of $P_{st}$. To this end, the algorithm monitors the switching pattern history of the heating elements 122, 124 and identifies load frequencies for each load.). For instance, the switching frequency of a high load, e.g. the aforementioned 534 W load, may be reduced, which may be compensated by an increase the switching frequency of a small load, e.g. the aforementioned 267 W load. In the context of the present invention, a reference to a change in switching frequency is intended to include an increase or decrease in the contiguous time interval during which a load is switched on.

The switching frequencies of these loads may differ based on stage-specific output requirements related to the target output temperature of each stage. The algorithm identifies the load with largest weighting, i.e. highest power and switching frequency. This load is most likely to be causing the increase in $P_{st}$. In an embodiment of the present invention, the algorithm next increases the target output temperature of the first stage if the largest weighting load is in first stage 110, or decreases the target output temperature of the first stage 110 if the largest weighting load is located in second stage 120. This has the effect that the switching frequency of the largest weighting load will be reduced because it will have to remain switched on for longer periods of time in order to heat the fluid to the target output temperature. Adjustments in temperature may be made by any suitable increment, e.g. increments of 1° C.

Such an adjustment may be accompanied by an increase of the switching frequency of the smaller weighting load. This usually does not negatively affect $P_{st}$.

At this point, it is emphasized that the algorithm does not calculate optimized switching pattern of the loads, but triggers changes to the pattern by altering a target temperature. This indirectly affects this pattern, since it causes the load controller to alter the load switching patterns. This is because the load controller determines the load pattern based on the basis of a difference between actual stage temperature and target temperature. A change in the target temperature triggered by the algorithm will therefore cause a change in this difference, which will lead to an altered load pattern being set by the load controller.

Figure 3:
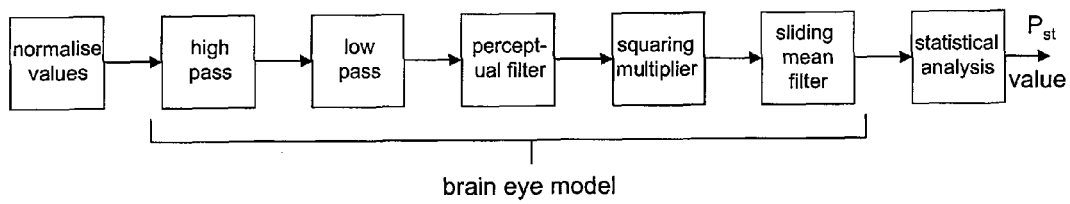
FIG. 3 shows a schematic representation of the brain-eye model.
Figure 4:
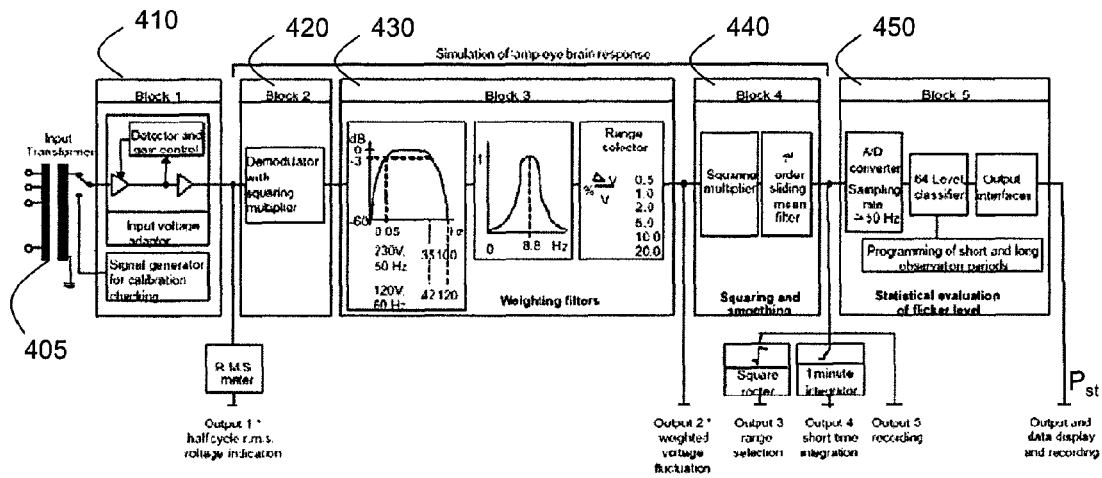
FIG. 4 shows another aspect of the system of the present invention in more detail.

Preferably, the flicker analyzer block 134 implements the human brain eye model in software. A schematic representation of this model is given in FIG. 3. FIG. 4 shows a possible implementation of a flicker analyzer block 134 based on the human brain eye model in more detail. This implementation has been chosen because it is compliant with the published IEC 61000-4-15 standard. A detailed description of this flicker analyzer block can be found in this standard; for this reason, only a brief description various sub-blocks shown in FIG. 4 will be given below.

Block 410 (also labeled block 1) establishes the reference level against which voltage fluctuations are measured. This block may be implemented by external hardware, e.g. block 405, used to transform an incoming AC signal to voltage level suitable for measurement by a microprocessor analogue to digital converter (ADC).

In block 420 (also labeled block 2), the modulation caused by flicker is separated from the 50-Hz or 60-Hz frequency of the AC supply. The squaring multiplier part of block 420 simulates the variation in light output from an incandescent bulb in response to voltage fluctuation. In short, the purpose of this block is to recover modulating signals while simultaneously suppressing the mains frequency carrier signal.

Block 430 accounts for human perceptibility. Typically, block 430 comprises three filters connected in series and a ranging circuit. One filter is a first-order high-pass having $F_c$ set to 0.05 Hz. A sixth-order Butterworth low-pass with a corner frequency at 35 Hz is also used. This filter limits the measured frequencies to those the eye can observe. The third filter provides a band-pass response centered at 8.8 Hz. The bandpass filter provides a very specific weighting function within the frequency band of interest between 0.05 Hz and 35 Hz and acts to simulate a portion of the overall filament-eye-brain response for an average human observer. This response peaks at 8.8 Hz. The ranging circuit of block 430 selects an appropriate measurement range. Because there could be a very wide range of perceptibility values, selection is necessary. Alternatively, a logarithmic classifier could be implemented in a flicker-meter design that would not require range switching.

Block 440 combines a squaring multiplier and a first-order sliding filter to simulate the brain's ability to identify change. In particular, block 440 provides functionality to implement the remainder of the filament-eye-brain model for flicker perception. The squaring operator simulates nonlinear eye-brain response characteristics while the first-order filter simulates perceptual storage effects in the brain. The first-order filter is specified as a sliding mean filter having a time constant of 0.3 seconds, which is implemented as a first-order low pass with a corner frequency of 0.53 Hz. Finally, block 450 performs the statistical analysis required to assess the probability that the measured flicker would be irritating or actually hazardous, for instance for sufferers from epileptic fits. The result of the statistical analysis is an estimate of a value of $P_{st}$, which is provided on an output of block 450. Typically, block 450 updates $P_{st}$ every second, based on statistical data gathered from blocks 410, 420, 430 and 440 every 10 ms.

Preferably, blocks 420-440 are implemented by means in software. Such an implementation can be easily realized by the skilled person, e.g. in a programming language such as C.

Figure 5:
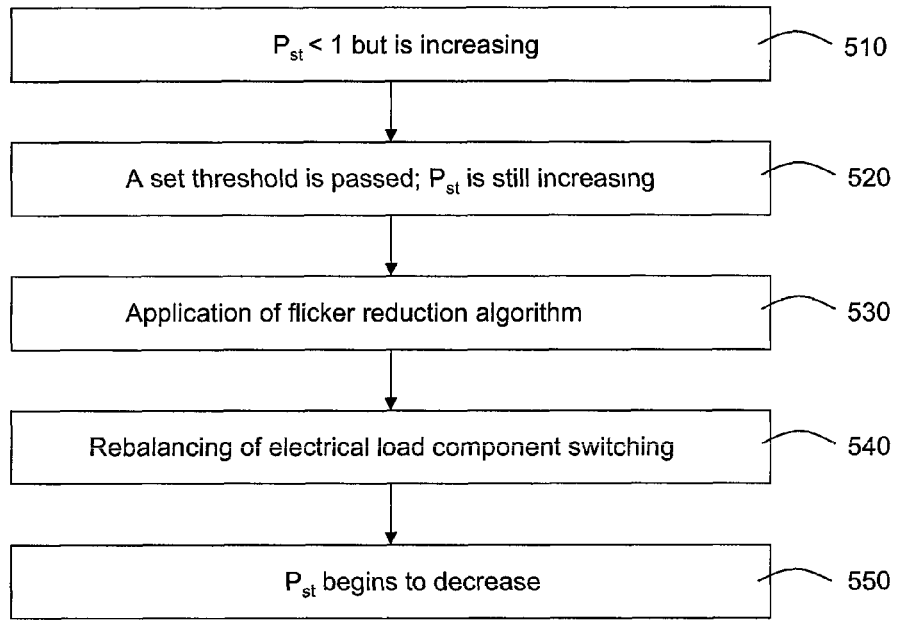
FIG. 5 shows a flowchart of a part of the method of the present invention.

Flicker is more tolerable if it occurs infrequently over short intervals. Tolerance decreases in the presence of increasing level intensity, event frequency, or event duration. The value of $P_{st}$ estimated by the flicker meter 400 is used for the purpose of reducing the occurrence of humanly perceptible flicker as demonstrated in FIG. 5, which depicts an operational flow of the heating controller 132. The operational flow is preferably realized in software. The heating controller 132 receives an updated value of $P_{st}$ from the flicker analyzer block 134, and compares this value with a previously received value of $P_{st}$. In step 510, the heating controller 132 evaluates if there is an increasing trend in the values of $P_{st}$. If this is the case, the heating controller 132 may directly move to step 530 and apply the flicker reduction algorithm of the present invention. Alternatively, the most recent value of Pst may be compared with the aforementioned predefined threshold, e.g. $P_{st}<0.8$ or $P_{st}<0.5$, and the heating controller 132 may proceed to step 530 if the most recent value of $P_{st}$ exceeds this threshold.

As previously explained, the application of the flicker reduction algorithm causes a rebalancing of the switching frequencies of the electrical load components of the system of the present invention. In the case of the fluid heater shown in FIG. 1, this rebalancing may be realized by adjusting the output temperature $T_1$ of the first stage 110. This has the effect that the larger load heating element 114 may be activated more infrequently, whereas the smaller load heating element 112 can be switched to compensate for this. In case $T_{out}$ is not lowered, the second stage 120 will produce an additional heating effort.

The second stage 120 may lower the switching frequency of the higher load heating element 124 and increase the switching frequency of the smaller load heating element 122 if the required output temperature $T_{out}$ can be reached this way. If the rebalancing is successful, the next cycle in which $P_{st}$ is estimated by the flicker analyzer block 134 will show a reduction in $P_{st}$, as indicated in step 550. This means that further rebalancing of the system may not be required, at least as long as the performance requirements of the system do not change. One exception is when reduction of the value of $P_{st}$ has not led to this value dropping below the predefined threshold, in which case a further rebalancing may be needed.

In extreme cases, rebalancing of the electrical load components may not lead to a reduction of the value of $P_{st}$, for instance if the performance requirements of the system result in a switching pattern that leads to an increase in $P_{st}$. In such a case, step 550 may not occur and $P_{st}$ may further increase despite the rebalancing step performed by the heating controller 132.

Figure 6:
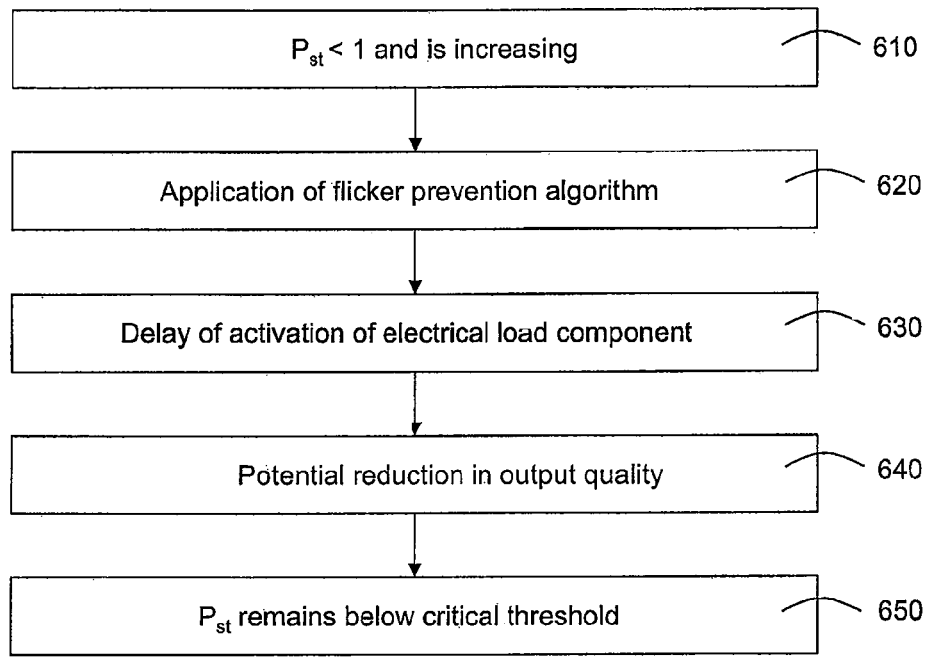
FIG. 6 shows a flowchart of another part of the method of the present invention.

This may cause a realistic threat of $P_{st}$ exceeding a critical threshold, e.g. $P_{st}>1$, which is the value of $P_{st}$ at which more than 50% of people exposed to such flicker experience the flicker as irritating. As previously explained, certain types of systems such as on-demand heaters are not allowed to exceed this value if they are to comply with applicable standards. FIG. 6 shows the operation flow of the heating controller 132 in such a scenario. In step 610, the heating controller detects that $P_{st}$ has exceeded the critical threshold, which triggers the execution of a flicker prevention algorithm by the microprocessor of the heating controller 132. This algorithm delays the activation of an electrical load component such as high load heater element 124, as demonstrated in step 630. This reduces the switching frequency of such components, and thus reducing $P_{st}$ below the critical threshold as shown in step 650. However, the consequence is a potential reduction in output performance as shown in step 640, e.g. a greater deviation in output temperature in the fluid temperature $T_{out}$ in case of the fluid heater 100 of FIG. 1. The flicker prevention algorithm is typically used in systems of the present invention that must comply with flicker standards such as the IEC 61000 standard, where an appliance may not cause flicker at $P_{st}$ values of higher than 1.

In other words, under circumstances when adjustment of the target output temperature of the first stage 110 within the limits still does not cause $P_{st}$ to reduce, for instance when the heating demands show large fluctuations over a relatively short time period, the algorithm will notice that its rebalancing efforts do not cause a reduction in $P_{st}$. In such a scenario, the algorithm will invoke the heating retardation algorithm causing an (increased) deviation from the intended output temperature of the system. It will be appreciated that the application of such a heating retardation algorithm is necessary in situations where the system has to comply with standards requirements such as those for on-demand heaters where $P_{st}$ is not allowed to exceed 1.

Figure 7:
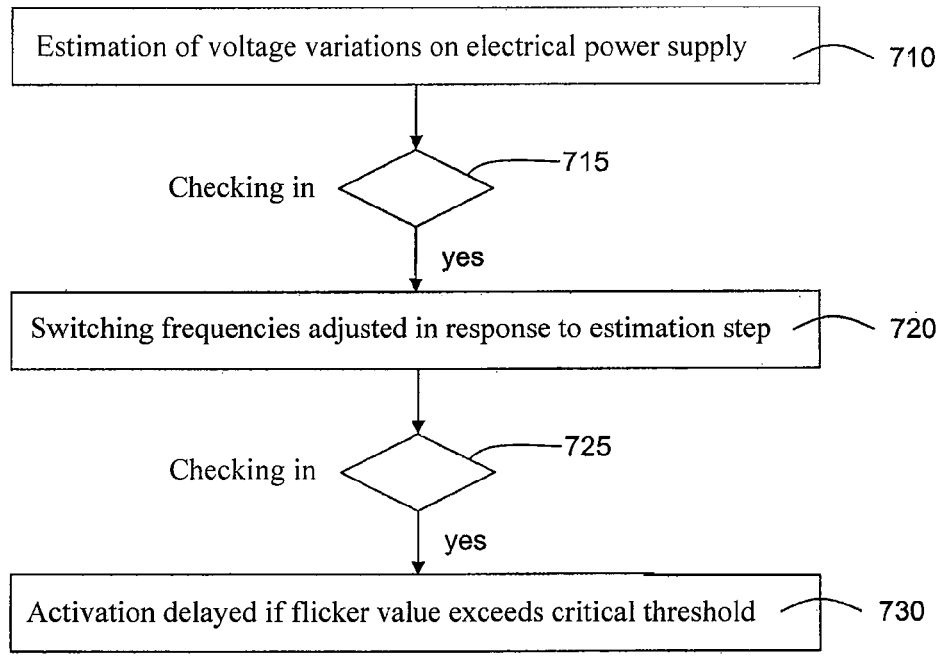
FIG. 7 shows another flowchart of the method of the present invention.

FIG. 7 summarizes the method of the present invention, which is implemented by the heating controller 132 and the flicker analyzer block 134. In step 710, an estimate is made of the voltage variations on the electrical power supply from the switching frequencies of the respective electrical load components of the system of the present invention during a predefined time frame. Preferably, step 710 comprises estimating an amount of observable flicker in a light source connected to the electrical power supply during the predefined time frame.

In step 720, the switching frequencies of the electrical load components having the first load and the electrical load components having the second load are adjusted in response to the estimation step 710 to reduce the voltage variations on the electrical power supply during a next time frame whilst ensuring that the plurality of stages are capable of producing the output during the next time frame.

Steps 710 and 720 may be implemented by estimating a short-term flicker value from the switching of the electrical load components during said time frame in step 710, and if the short-term flicker value exhibits an upward trend compared to a previous time frame, adjusting the switching frequencies of the electrical load components by reducing the switching frequencies of the electrical load components having a first load and increasing the switching frequencies of the electrical load components having the second load in step 720. This is a possible implementation of the operation flow shown in FIG. 5. Step 720 may be preceded by checking in step 715 if the short-term flicker value $P_{st}$ exceeds a predefined threshold.

The method may further comprise a step 730 in which the activation of at least some of the electrical load components is delayed if the short-term flicker value exceeds a critical threshold, as checked in step 725. This is a possible implementation of the operation flow shown in FIG. 6.

The method is preferably applied to the fluid heating system 100 of FIG. 1, although other applications of the method of the present invention are equally feasible, as suggested earlier.

It should be noted that the above-mentioned embodiments illustrate rather than limit the invention, and that those skilled in the art will be able to design many alternative embodiments without departing from the scope of the appended claims. In the device claim enumerating several means, several of these means can be embodied by one and the same item of hardware. The mere fact that certain measures are recited in mutually different dependent claims does not indicate that a combination of these measures cannot be used to advantage.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system designed to be connected to an electrical power supply, the system comprising:
a first heating stage comprising at least one first heating element and a second heating stage comprising at least one second heating element; and
a controller configured to control the heating elements, the controller operable to estimate voltage variations on the electrical power supply from the switching frequencies of the respective heating elements during a predefined time frame, the controller comprising a microprocessor that executes an algorithm configured to adjust the switching pattern of the heating elements of the first and second heating stages in response to the estimation to reduce the voltage variations on the electrical power supply during a next time frame while ensuring that the plurality of stages are capable of producing a target output temperature during the next time frame.

2. The system as claimed in claim 1, wherein the controller is configured to estimate an amount of observable flicker in a light source connected to the electrical power supply during the predefined time frame.

3. The system as claimed in claim 2, wherein:
the controller can estimate a short-term flicker value ($P_{st}$) from the switching of the electrical load components during the time frame; and
the algorithm reduces the switching frequencies of the electrical load components having the first load and increases the switching frequencies of the electrical load components having the second load if the short-term flicker value exhibits an upward trend compared to a previous time frame.

4. The system as claimed in claim 3, wherein the algorithm adjusts the switching frequencies of the electrical load components if the short-term flicker value ($P_{st}$) exceeds a predefined threshold.

5. The system as claimed in claim 2, wherein the controller comprises a software-implemented flicker meter to estimate an amount of observable flicker in a light source connected to the electrical power supply during the predefined time frame.

6. The system as claimed in claim 3, wherein the microprocessor further executes an algorithm to delay the activation of at least some of the electrical load components if the short-term flicker value ($P_{st}$) exceeds a critical threshold.

7. The system as claimed in claim 1, wherein:
the first heating stage heats a fluid to a first temperature ($T_1$), and the second heating stage heats the fluid from the first temperature to a second temperature ($T_{out}$).

8. The system as claimed in claim 7, wherein the first heating stage and the second heating stage each comprise an additional heating element, and wherein the algorithm reduces the switching frequency of the first and second heating elements and increases the switching frequency of the additional heating elements to reduce the voltage variations on the electrical power supply.

9. The system as claimed in claim 7, wherein the algorithm adjusts the first temperature ($T_1$) to reduce the voltage variations on the electrical power supply.

10. A method of controlling a system connected to an electrical power supply, the method comprising:
providing a first heating stage comprising at least one first heating element and a second heating stage comprising at least one second heating element;
estimating voltage variations on the electrical power supply from the switching frequencies of the respective first and second heating elements during a predefined time frame; and
adjusting the switching pattern of the first and second heating elements in response to the estimation to reduce the voltage variations on the electrical power supply during a next time frame while ensuring that the first and second heating stages are capable of producing the output during the next time frame.

11. The method as claimed in claim 10, wherein the step of estimating voltage variations on the electrical power supply comprises estimating an amount of observable flicker in a light source connected to the electrical power supply during the predefined time frame.

12. The method as claimed in claim 11, further comprising:
estimating a short-term flicker value ($P_{st}$) from the switching of the first and second heating elements during said time frame, and if the short-term flicker value exhibits an upward trend compared to a previous time frame, adjusting the switching pattern of the first and second heating elements by reducing the switching frequencies of the at least one first heating element and increasing the switching frequencies of the at least one second heating element.

13. The method as claimed in claim 12, wherein the step of adjusting the switching pattern of the first and second heating elements comprises adjusting the frequencies if the short-term flicker value ($P_{st}$) exceeds a predefined threshold.

14. The method as claimed in claim 12, wherein the method further comprises delaying the activation of at least one of the first and second heating elements if the short-term flicker value ($P_{st}$) exceeds a critical threshold.

15. The method as claimed in claim 10, wherein the method further comprises reduce the switching frequency of the at least one first heating element and increase the switching frequency of the at least one second heating element to reduce the voltage variations on the electrical power supply.

16. The method as claimed in claim 15 comprising:
reducing the activation frequency of the at least one first heating element; and
increasing the activation frequency of the at least one second heating element to reduce the voltage variations on the electrical power supply.

* * * * *